United States Patent [19]
Nilkanth et al.

[11] Patent Number: 5,879,010
[45] Date of Patent: Mar. 9, 1999

[54] SEAL ASSEMBLY WITH MECHANICALLY JOINED ANTI-EXTRUSION RINGS

[75] Inventors: Vinay K. Nilkanth, Souderton; Paul E. Roberts, Philadelphia, both of Pa.; Saul Guevara, Baldwin Park; Romel R. Ner, Carson, both of Calif.

[73] Assignee: Green Tweed of Delaware, Inc., Wilmington, Del.

[21] Appl. No.: 898,539

[22] Filed: Jul. 22, 1997

[51] Int. Cl.$^6$ .................................................... F16J 15/32
[52] U.S. Cl. ........................................ 277/545; 277/584
[58] Field of Search .................... 277/584, 589, 277/545, 548

[56] References Cited

U.S. PATENT DOCUMENTS

| | | | |
|---|---|---|---|
| 2,815,973 | 12/1957 | Jackson | 277/584 X |
| 3,095,619 | 7/1963 | Peterson . | |
| 3,188,099 | 6/1965 | Johnson et al. . | |
| 3,381,970 | 5/1968 | Brown | 277/584 X |
| 3,885,801 | 5/1975 | Scannell . | |
| 3,930,657 | 1/1976 | Svensson et al. . | |
| 4,040,636 | 8/1977 | Albertson et al. | 277/584 X |
| 4,281,590 | 8/1981 | Weaver . | |
| 4,346,647 | 8/1982 | Weaver . | |
| 4,468,042 | 8/1984 | Pippert et al. . | |
| 4,566,702 | 1/1986 | Traub . | |
| 4,576,386 | 3/1986 | Benson et al. . | |
| 4,630,833 | 12/1986 | Boyle et al. . | |
| 4,635,945 | 1/1987 | Beck . | |
| 4,749,201 | 6/1988 | Hunger . | |
| 5,052,760 | 10/1991 | Cadeddu | 277/589 X |
| 5,328,177 | 7/1994 | Lair et al. . | |
| 5,524,905 | 6/1996 | Thoman et al. . | |
| 5,603,511 | 2/1997 | Keyser, Jr. et al. . | |

FOREIGN PATENT DOCUMENTS

0349938A1  1/1990  European Pat. Off. .

OTHER PUBLICATIONS

Greene, Tweed & Co. Brochure entitled AGT Ring: The Optimum Sealing Solution From Greene Tweed & Co., 13 pages, (admitted prior art).

Greene, Tweed & Co. Brochure entitled ACT Ring Advanced Concept T Ring, 4 pages, (admitted prior art).

*Primary Examiner*—Peter M. Cuomo
*Assistant Examiner*—Hanh V. Tran
*Attorney, Agent, or Firm*—Panitch Schwarze Jacobs & Nadel, P.C.

[57] ABSTRACT

A seal assembly adapted for use in sealing two mating surfaces spaced apart by a gap is provided. The seal assembly includes a sealing element adapted to be located in a groove in one of the mating surfaces. A back-up ring assembly is provided which includes a first back-up ring made from a relatively soft material and a second back-up ring made from a relatively hard material. The first back-up ring includes a body with first and second sides, with one of a groove and an interlocking projection being located on the body along the second side. The second back-up ring includes a body with first and second sides, with the other of the groove and the interlocking projection being located along the first side. The groove is complementarily shaped to the projection and includes a rounded mating surface such that the first and second back-up rings can be interlocked together by connecting the interlocking projection and the groove, with the rounded mating surface reducing stress concentrations on the first and second back-up rings under load.

12 Claims, 4 Drawing Sheets

SEAL ASSEMBLY WITH MECHANICALLY JOINED ANTI-EXTRUSION RINGS

BACKGROUND OF THE INVENTION

The present invention relates to a seal assembly for sealing a clearance space between first and second displacable cylindrical surfaces, and more particularly to a seal assembly which includes mechanically inter-locked anti-extrusion rings located adjacent to at least one side of the seal.

The use of seal assemblies which include a T-shaped sealing ring and a pair of back up or anti-extrusion rings to form a seal between two relatively displacable cylindrical surfaces is generally known. Such assemblies are often used in hydraulic or pneumatic systems, in both rod in bore and piston in cylinder seal applications. T-shaped seal assemblies provide a significant performance advantage over the previously known O-ring seal configurations.

In one known seal arrangement described in U.S. Pat. No. 5,524,905, which is assigned to the assignee of the present invention and incorporated herein by reference as if fully set forth, a T-shaped seal ring with two anti-extrusion rings is provided. The anti-extrusion rings prevent the seal from extruding into the gap between the cylindrical surfaces being sealed. In one embodiment, the anti-extrusion rings are provided in two pieces. An inboard ring is provided which contacts the upstanding portion of the seal and an outboard ring is located between the inboard ring and the wall of the groove. The inboard ring is made of a softer, resilient material in order to avoid abrasive wear to the upstanding seal leg. The outboard back-up ring is preferably made of a harder material and prevents abrasion of the inner ring on the groove wall and extrusion of the inner ring in the clearance space. However, the known anti-extrusion rings of this type sometimes create problems during installation. This concern is primarily due to the number of pieces needed to be installed.

In another known seal arrangement described in U.S. Pat. No. 3,188,099, interconnected back-up rings are provided for a seal. An inner back-up ring is provided with a groove, and a rib is provided on the outer back-up ring which can be a dovetail fit with the groove. However, the rib and groove have angular corners which increase stress concentrations in the back-up rings at the juncture.

It is also known to use anti-extrusion rings with cap seals. Cap seals generally consist of an elastomer energized seal located in a groove, with the elastomer energizer pressing the seal member against the mating surface. Anti-extrusion rings are provided on each side of the seal member and the energizer, adjacent to each of the groove side walls, in order to prevent abrasion and extrusion of the seal and the energizer. In one known cap seal, described in U.S. Pat. No. 4,576,386, the anti-extrusion rings are made of inner and outer elements. The outer element is made from a relatively hard, non-resilient material which is sufficiently strong to prevent extrusion of the cap seal. The inner member is made of a relatively soft plastic material which does not abrade or chafe the soft elastomer energizer. The outer member and inner member are provided as single pieces which matingly position the outer member adjacent to the inner member. However, the pieces must be formed as complete rings or be bonded together in order to maintain the outer member in position. This limits the installation options.

It would be desirable to provide a two-piece backup ring to protect against extrusion of a seal member at high pressure or vacuum, which also protects the seal member from excessive abrasion. Ideally such a seal would provide the option of being closed around a fixed shaft and desirably have a fool proof assembly arrangement to assure proper alignment of the soft and the hard back-up rings. Preferably, such back-up rings can be machined or formed from strips of material to a specific size as appropriate for a given application.

BRIEF SUMMARY OF THE INVENTION

Briefly stated, the present invention provides a seal assembly adapted for use in sealing two mating operational surfaces spaced apart by a gap, with one of the surfaces including a seal assembly receiving groove. The seal assembly comprises a sealing element adapted to be located in the groove. A first back-up ring assembly is provided. The back-up ring assembly is made from a relatively soft material and includes a body with first and second sides. One of a groove and an interlocking projection is located on the body along the second side. A second back-up ring is provided having a body with first and second sides which is made from a relatively hard material. The second back-up ring includes the other of the groove and the interlocking projection. The interlocking projection includes a narrow base portion which extends outwardly from the body of the one of the first and second back-up rings which includes the interlocking projection and a rounded anchor portion connected to the base portion. The rounded anchor portion has a width which is greater than a width of the base portion and includes rounded sides. The groove is complementarily shaped to the projection and includes an opening which is narrower than the anchor portion and a rounded mating surface such that the first and second back-up rings can be interlocked together by connecting the interlocking projection and the groove. The first back-up assembly is adapted to be located in the seal assembly receiving groove adjacent to the sealing element to prevent extrusion of the sealing element into the gap between the two mating operational surfaces, with the rounded mating surface of the groove reducing stress concentrations in the first and second back-up rings under load.

In another aspect, the present invention provides a seal assembly adapted for use in sealing two mating operational surfaces spaced apart by a gap with one of the surfaces including a seal assembly receiving groove. The seal assembly comprises a sealing element adapted to be located in the groove. A first back-up ring assembly is provided and includes a first back-up ring having a body with first and second sides made from a relatively soft material. The first side is adapted to nest against the sealing element. One of a groove and a projection is located on the body along the second side. A second back-up ring having a body with first and second sides is also provided and is made from a relatively hard material. The second back-up ring includes the other of the groove and the projection. The projection extends outwardly from the one of the first and second back-up rings which includes the projection at an acute angle relative thereto. A fillet surface is located at the acute angle between the projection and the body of the one of the first and second back-up rings. The groove is complementarily shaped to the projection such that the first and second back-up rings can be interlocked together by connecting the projection and the groove. The first back-up ring assembly is adapted to be located in the seal assembly receiving groove adjacent to the sealing element with the first side of the first back-up ring adjacent to the sealing element to reduce wear on the sealing element while preventing extrusion of the sealing element into the gap between the two mating surfaces.

In another aspect, the present invention provides a seal assembly adapted for use in sealing two mating operational surfaces spaced apart by a gap, with one of the surfaces including an annular seal assembly receiving groove. The seal assembly includes a cap seal having a sealing surface which is adapted to contact one of the mating operational surfaces, and an opposing second surface. An energizer/expander element is provided which has a first surface which faces the cap seal. An interlocking projection is located on one of the cap seal and the energizer/expander element. The interlocking projection includes a leg portion, which extends from the one of the cap seal and the energizer/expander element toward the other of the cap seal and the energizer/expander element, and a rounded anchor portion connected to the leg portion. The rounded anchor portion has a width which is greater than the width of the leg portion. A groove is located on the other of the cap seal and the energizer/expander element. The groove is complementary to the interlocking projection and has a rounded mating surface and an opening which is narrower than the anchor portion such that the cap seal and the energizer/expander element are mechanically interlocked together by the connection of the interlocking projection and the groove. The rounded mating surface of the groove reduces stress concentrations in the cap seal and energizer/expander element.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
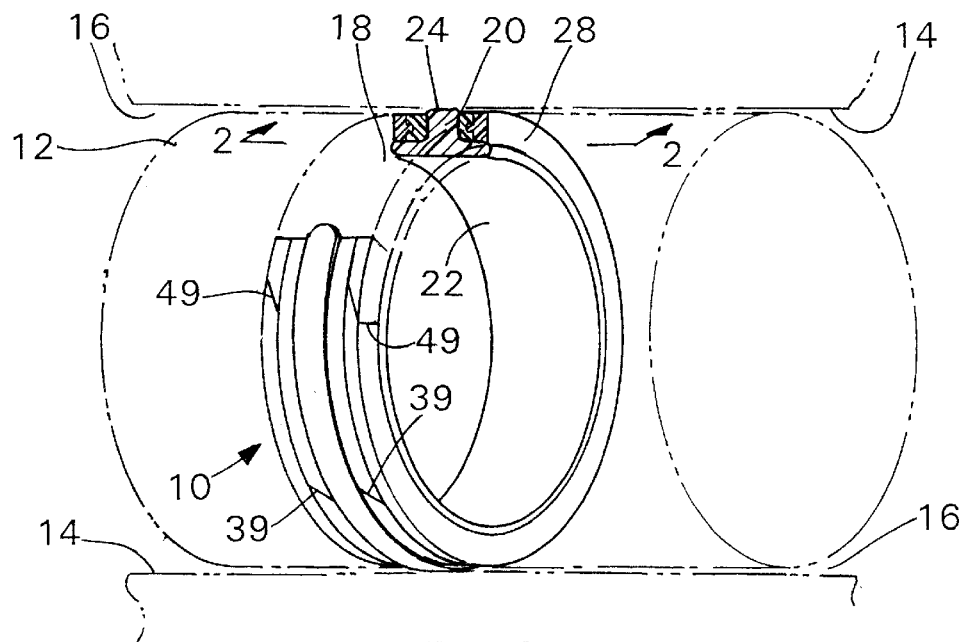
FIG. 1 is a perspective view, partially in cross-section, of a seal assembly in accordance with a first preferred embodiment of the invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the seal assembly, and designated parts thereof. The terminology includes the words specifically mentioned above, derivatives thereof and words of similar import.

Figure 2:
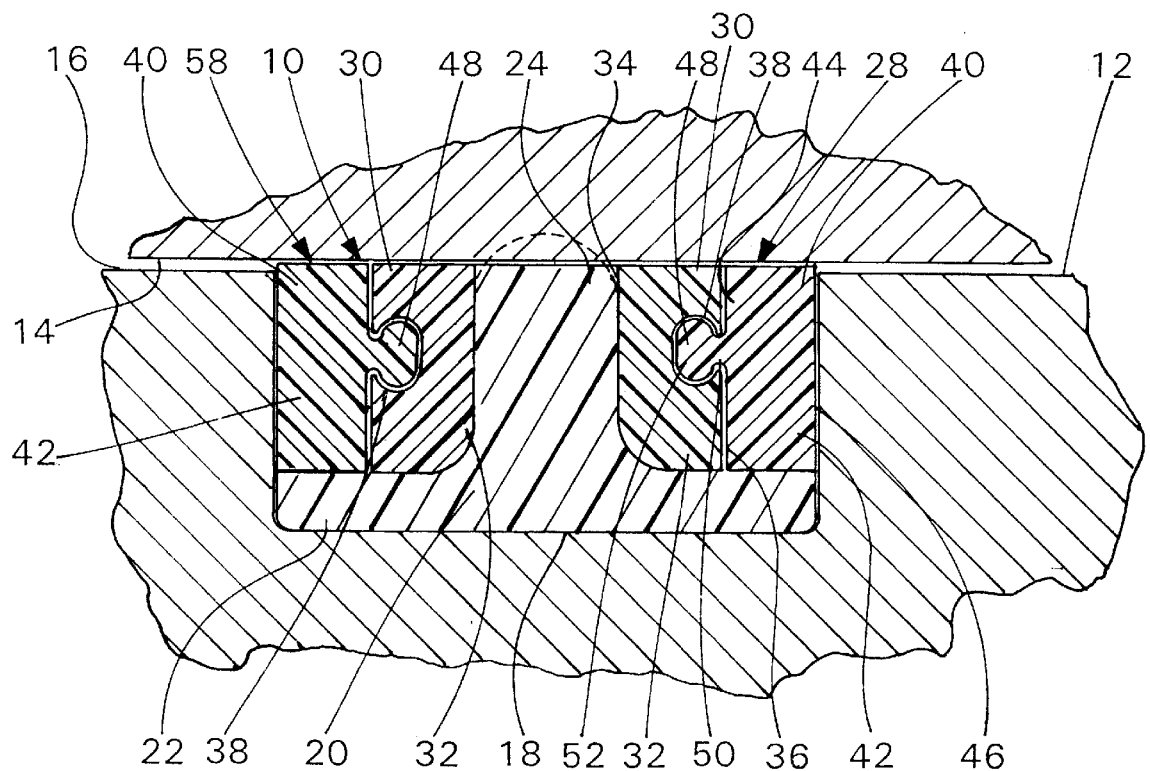
FIG. 2 is a greatly enlarged cross-sectional view of the seal assembly shown in FIG. 1 taken along lines 2—2 FIG. 1.

Referring to the drawings, wherein like numerals indicate like elements throughout, there is shown in FIGS. 1 and 2 a first embodiment of a seal assembly 10 adapted for use in sealing two mating operational surfaces 12, 14 spaced apart by a gap 16. Preferably, one of the surfaces 12, 14 includes a seal assembly receiving groove 18. In the first embodiment, preferably the two mating operational surfaces 12, 14 are cylindrically shaped and the seal assembly receiving groove 18 is annular and is located on the inner surface 12.

The arrangement illustrated in FIG. 1 is a piston in cylinder seal arrangement with the seal assembly receiving groove 18 being located on the operational surface 12 of the piston such that the seal engages the operational surface 14 of the cylinder to seal the gap between the two operational surfaces 12, 14 and allow for relative sliding movement of the piston within the cylinder. However, it will be recognized by those skilled in the art from the present disclosure that the seal assembly 10 can be used in a rod in bore arrangement wherein a groove (not shown) is located on the inside surface of a preferably cylindrical bore for sealing against the smooth mating surface of a rod which is movable relative to the bore.

In the first preferred embodiment, the seal assembly includes a sealing element 20 which is adapted to be located in the groove 18. Preferably, the sealing element 20 is an annular sealing ring having a generally T-shaped cross section. However, as described below in conjunction with the alternate embodiments of the invention, the sealing element may have many different forms. In the first preferred embodiment, the sealing element 20 includes an axially extending base portion 22 and a radially extending leg 24 which engages the mating operational surface 14 opposite to the groove 18.

T-shaped sealing elements 20 of this type are generally known and are preferably made of a resilient material which is capable of recovering its size and shape after deformation, such as an elastomeric or polymeric material, such as nitrile rubber. However, it is understood by those skilled in the art that the sealing element 20 could be constructed of other flexible materials, such as fluoroelastomers, ethylene-propylene and other natural or synthetic elastomeric materials of any type which are useful for a particular application. Selection of a suitable material is well within the capabilities of the skilled artisan.

Still with reference to FIGS. 1 and 2, a first back-up ring assembly 28 is provided. The first back-up ring assembly 28 includes a first back-up ring 30 having a body 32 with first and second sides 34, 36. The first back-up ring 30 is preferably made of a relatively soft polymeric material. The first side 34 is adapted to nest against the sealing element 20.

One of a groove 38 and a projection 48, and preferably the groove 38 is located on the body 32 along the second side 36.

A second back-up ring 40 having a body 42 with first and second sides 44, 46 is also provided. The second back-up ring 40 is preferably made from a polymeric material which is a relatively harder material than the first back-up ring 30 to prevent extrusion of the relatively softer polymeric material of the first back-up ring 30. The second back-up ring 40 includes the other of the groove 38 and the interlocking projection 48, and preferably includes the interlocking projection 48, as shown.

The interlocking projection 48 includes a narrow leg portion 50 which extends outwardly from the first side 44 of the body 42 of the second back-up ring 40 and a rounded anchor portion 52 connected to the leg portion 50. The anchor portion 52 has rounded sides and a width which is greater than a width of the leg portion 50. Those skilled in the art will recognize from the present disclosure that the projection 48 would extend from the second side 36 of the first back-up ring 30 toward the first side 44 of the second back-up ring 40 in the event that the projection 48 was provided on the first back-up ring 30.

Still with reference to FIG. 2, the groove 38 on the first back-up ring 30 is complementarily shaped to the projection 48 on the second back-up ring 40. More particularly, the groove 38 has a rounded mating surface which is complementary to the anchor portion 52 such that the first and second back-up rings 30, 40 can be interlocked together by connecting the interlocking projection 48 and the groove 38. This is accomplished by inserting the interlocking projection 48 in the groove 38 opening and pressing or sliding the first back-up ring 30 together with the second back-up ring 40 such that the first and second back-up rings 30, 40 are connected together. In the first preferred embodiment, the body 32 of the first back-up ring 30 elastically deforms to allow the projection 48 to be seated in the groove 38.

It will be recognized by those skilled in the art that the projection and groove could be reversed, as noted above, if desired. The groove would then be located on the second back-up ring and the projection would located on the first back-up ring, depending on the materials being used for the first and second back-up rings 30, 40.

The first back-up ring assembly 28 is adapted to be located in the groove 18 in the first mating surface 12 adjacent to the sealing element 20 to prevent extrusion of the sealing element 20 into the gap 16 between the two mating surfaces 12, 14. The rounded mating surface of the groove 38 in the first back-up ring 30 reduces stress concentrations in the first back-up ring 30 under load, increasing the life of the back-up ring 30. At the same time, the mechanical interlock between the first and second back-up rings 30, 40 provides for ease of assembly by sliding or pressing of the interlocking projection 48 into the first back-up ring 30, which is relatively soft (and unless otherwise held in position can fall out of the groove 18 during installation), to the second back-up ring 40 which is made of a harder material which is stiff enough to remain in the groove 18 during installation. This also allows for easier installation of a smooth rod into a bore having a seal assembly receiving groove or a grooved seal assembly carrying piston to be inserted in a smooth cylinder without breakage of the back-up rings 30, 40, and prevents separation of the back-up ring assembly 28.

As shown in FIGS. 1 and 2, preferably the seal assembly 10 comprises a second back-up ring assembly 58 located in the groove 18 in the first mating surface 12 on an opposite side of the seal 20 from the first back-up ring assembly 28. The second back-up ring assembly 58 is identical to the first back-up ring assembly 28 and like elements have been labeled with the same reference numerals. The only difference between the first and second back-up ring assemblies 28, 58 is the orientation with respect to the sealing element 20 being reversed such that the first back-up ring 30 of the second back-up ring assembly 58 is in contact with and supports the opposite side of the leg 24 of the sealing element 20. The first and second back-up ring assemblies 28, 58 are preferably nested on the base 22 of the sealing element 20 against the protruding leg portion 24. However, as described in detail below in connection with the alternate embodiments of the invention, the back-up rings may nest directly in the groove 18, depending upon the configuration of the sealing element.

The back-up rings 30 in the first and second back-up assemblies 28, 58 are positioned adjacent to the sealing element 20 to reduce abrasion wear on the sealing element 20 since the softer material of the first back-up ring 30 contacts both sides of the sealing element 20. In the first preferred embodiment, the first back-up ring 30 comprises a softer polymeric material, such as PTFE. However, it will be recognized by those skilled in the art based on the present disclosure that other types of materials may be used, such as filled PTFE or any other suitable polymeric or elastomeric material. Preferably, the material used for the first back-up ring 30 is resilient enough such that the body 32 of the back-up ring 30 elastically deforms to allow interlocking engagement of the groove 38 with the projection 48 of the second back-up ring 40.

The second back-up ring 40 preferably also comprises a relatively harder polymeric material. In the preferred embodiment, the second back-up ring 40 is made of polyether etherketone, poly(amide imide), or polyether sulfone, which are available from a number of sources. It will be recognized by those skilled in the art from the present disclosure that other materials may also be used, such as polyether etherketone which may be filled with reinforcing materials, if desired, to provide increased creep and wear resistance. Other suitable plastic or polymeric materials may also be used as long as they have the required properties to resist deformation at high pressures and temperatures. The projection 48 is preferably machined or molded with the second back-up ring body 42 as a single piece.

In the first preferred embodiment, the first and second back-up rings 30, 40 are preferably machined or formed from extruded or molded lengths of back-up ring material having the desired cross-section. Scarf joints 39, 49 are located in each of the first and second back-up rings 30, 40, respectively, for forming and maintaining the back-up rings 30, 40 in the desired shape. The scarf joints 39, 49 are preferably offset and are held in a closed position by the interlocking connection between the groove 38 and projection 48 in each back-up ring assembly 28, 58. The interlocking connection is needed to convert the two split rings to act as a solid ring in order to prevent elastomeric extrusion and nibbling of the sealing element 20 at the split region. It will be recognized by those skilled in the art from the present disclosure that the first and second back-up rings 30, 40 may be provided with offset butt joints in some applications in place of the scarf cut, or may be formed as endless rings which do not need to be joined, depending upon the particular application.

Referring now to FIGS. 3–8, second through seventh embodiments of seal assemblies 92, 93, 94, 95, 96 and 97 in accordance with the present invention are shown. The seal assemblies 92–97 all include a first back-up ring assembly 28a–28f similar to the back-up ring 28 described above in accordance with the first preferred embodiment of the invention. The back-up ring assemblies 28a–28f include first and second back-up rings 30a–30f, 40a–40f. The first and second back-up rings 30a–30f, 40a–40f are similar to back up rings 30 and 40 described above and include the same groove 38 and interlocking projection 48 for interlocking the first and second back-up rings together. The only difference is that the shapes of the back-up rings 30a–30f, 40a–40f have been modified for use with different types of sealing elements 20a–20f, as described in detail below.

Figure 3:
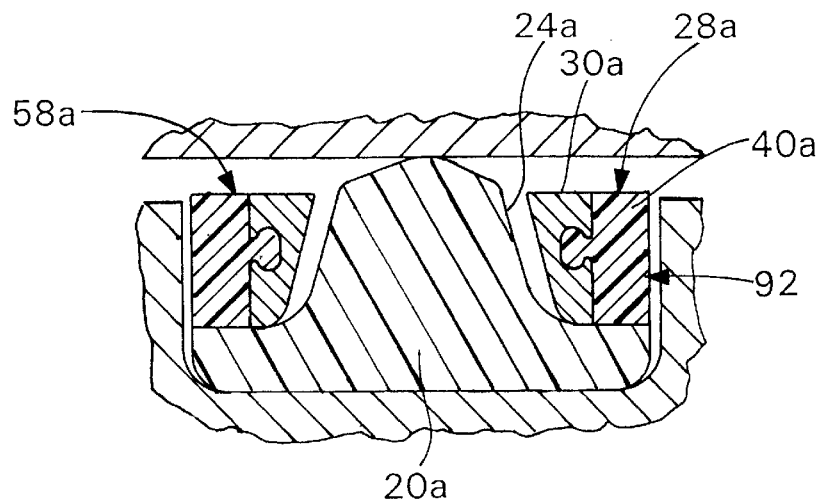
FIG. 3 is a cross-sectional view similar to FIG. 2 showing a seal assembly in accordance with a second preferred embodiment of the invention.

In the second embodiment of the seal assembly 92, shown in FIG. 3, the sealing element 20a is generally T-shaped, similar to the first embodiment of the sealing element 20. The first back-up ring 30a has a modified profile on the first face to match the upstanding leg 24a of the sealing element 20a. As shown, preferably a second back-up ring assembly 58a is provided on the opposite side of the sealing element 20a.

Figure 4:
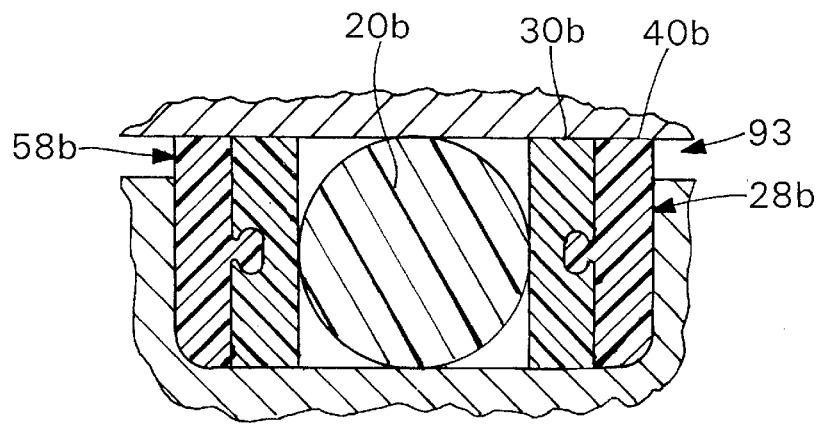
FIG. 4 is a cross-sectional view similar to FIG. 2 showing a seal assembly in accordance with a third preferred embodiment of the invention.

In the third embodiment of the seal assembly 93, shown in FIG. 4, the sealing element 20b is an O-ring. The first back-up ring 30b has a flat first face to support the O-ring 20b and prevent extrusion of the O-ring 20b into the gap. As shown, preferably a second back-up ring assembly 58b is provided on the opposite side of the O-ring 20b.

Figure 5:
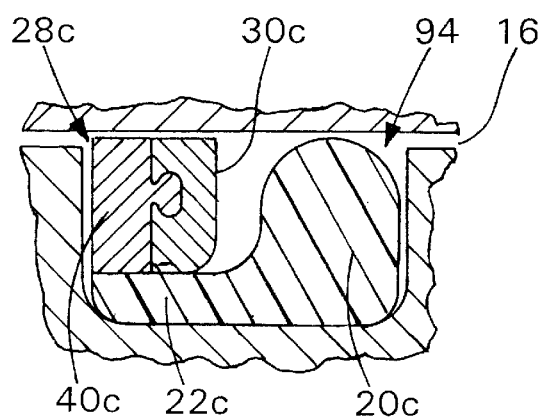
FIG. 5 is a cross-sectional view similar to FIG. 2 showing a seal assembly in accordance with a fourth preferred embodiment of the invention.

As shown in FIG. 5, the fourth preferred embodiment of the seal assembly 94 includes a single interlocked back-up ring assembly 28c. The back-up ring assembly 28c has first and second back-up rings 30c, 40c, and is located on the low pressure side of an L-ring sealing element 20c to prevent extrusion of the sealing element 20c into the gap 16. The back-up ring assembly 28c is nested on a base 22c of the sealing element 20c.

Figure 6:
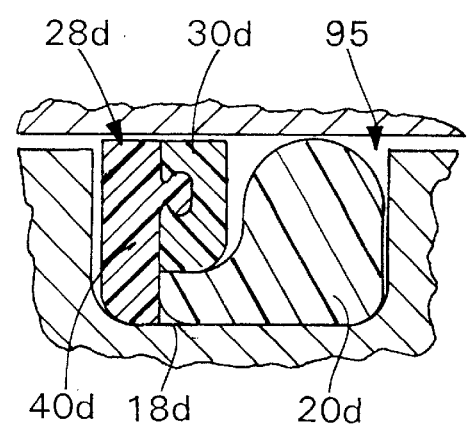
FIG. 6 is a cross-sectional view similar to FIG. 2 showing a seal assembly in accordance with a fifth preferred embodiment of the invention.

Referring now to FIG. 6, a fifth preferred embodiment of a seal assembly 95 in accordance with the present invention is shown. The fifth embodiment of the seal assembly 95 is similar to the fourth embodiment 94, and includes a modified L-ring sealing element 20d. The base of the L-ring sealing element 20d is narrower than the width of the groove 18d. The backup ring assembly 28d is located on the low pressure side of the seal 20d and includes a second back-up ring 40d which extends to the bottom of the groove 18d to fill the space. The first back-up ring 30d nests on the base 22d of the L-ring sealing element 20d.

Figure 7:
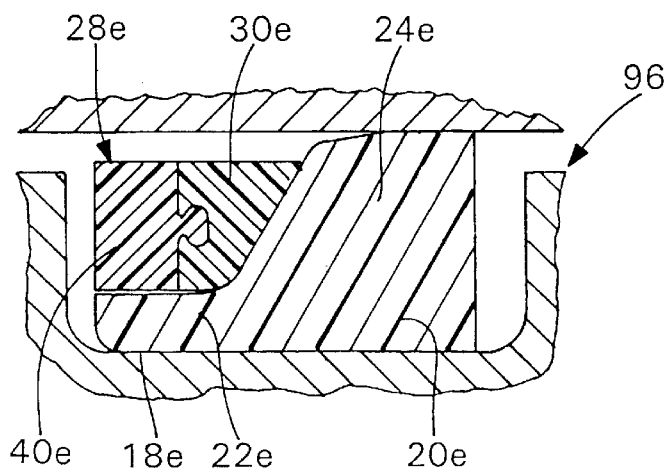
FIG. 7 is a cross-sectional view similar to FIG. 2 showing a seal assembly in accordance with a sixth preferred embodiment of the invention.

Referring now to FIG. 7, a sixth preferred embodiment of a seal assembly 96 in accordance with the present invention is shown. The sixth embodiment of the seal assembly 96 is similar to the fourth embodiment 94, and includes a modified L-ring sealing element 20e. The base of the L-ring sealing element 20e has a width which is adapted to fill the groove 18e, and the back-up ring assembly 28e, which includes the interlocked first and second back-up rings 30e, 40e, nests on the base 22e. The profile of the first back-up ring 30e has been modified to correspond to the profile of the upstanding leg 24e of the sealing element 20e.

Figure 8:
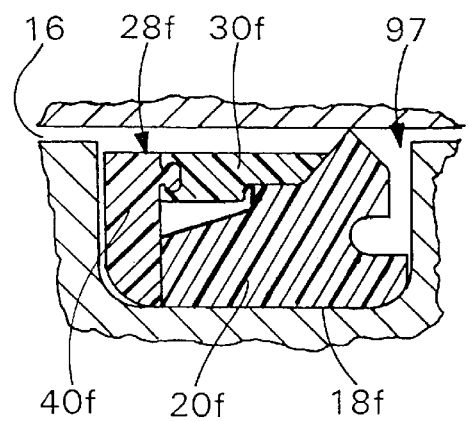
FIG. 8 is a cross-sectional view similar to FIG. 2 showing a seal assembly in accordance with a seventh preferred embodiment of the invention.

Referring now to FIG. 8, a seventh preferred embodiment of a seal assembly 97 is shown. In the seventh preferred embodiment of the seal assembly 97, a sealing element 20f which includes an elastically energized lip is provided. The sealing element 20f is narrower than the groove 18f. A single interlocked back-up ring assembly 28f is located on the low pressure side of the sealing element 20f to prevent extrusion of the sealing element 20f into the gap 16. The first back-up ring 30f includes a profile which matches the profile of the sealing element 20f, and is supported on the sealing element 20f. The second back-up ring 40f extends to the bottom of the groove 18f and prevents abrasion of the energizer portion of the sealing element 20f, as well as supports the first back-up ring 30f to prevent extrusion of the sealing element 20f into the gap 16.

Figure 9:
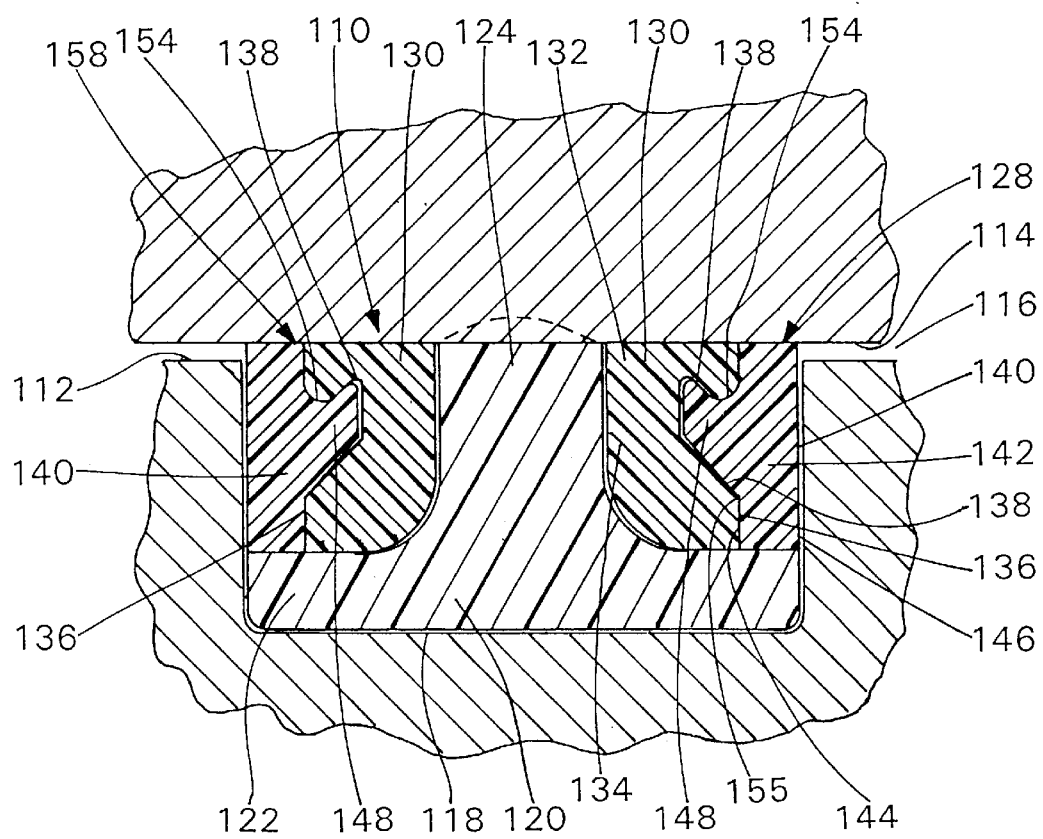
FIG. 9 is a greatly enlarged cross-sectional view similar to FIG. 2 showing an eighth embodiment of a seal assembly in accordance with the present invention.

Referring now to FIG. 9, an eighth embodiment of a seal assembly 110 in accordance with the present invention is shown. The seal assembly 110 in accordance with the eighth embodiment of the invention is similar to the seal assembly 10 in accordance with the first embodiment of the invention, and similar elements have been identified with like element numbers having the prefix "1". For example, the first back-up ring assembly 128 in the seal assembly 110 in accordance with the eighth preferred embodiment of the invention is similar to the first back-up ring assembly 28 described above in conjunction with the seal assembly 10 in accordance with the first preferred embodiment of the invention. The differences between the seal assemblies 10, 110 in accordance with the first and eighth preferred embodiments of the invention are described in detail below.

In the eighth preferred embodiment of the invention, the seal assembly 110 is adapted for use in sealing two mating operational surfaces 112, 114 spaced apart by a gap 116. One of the surfaces 112 includes an annular seal assembly receiving groove 118. A sealing element 120 is adapted to be located in the groove 118 with a first back-up ring assembly 128 being located between the upstanding sealing leg 124 of the sealing element 120 and the groove wall.

The first back-up ring assembly 128 includes a first back-up ring 130 and a second back-up ring 140. The first back-up ring 130 includes first and second sides 134, 136, with one of a groove 138 and a projection 148, and preferably the groove 138 located along the second side 136 of the first back-up ring 130. The second back-up ring 140 includes first and second sides 144, 146. The other of the groove 138 and the projection 148, and preferably the projection 148 extends outwardly from the first side 144 of the second back-up ring 140 at an acute angle relative to the first side 144 of the second back-up ring 140. In the eighth preferred embodiment 110, the projection 148 extends outwardly toward the gap 116 to be sealed. However, it will be recognized by those skilled in the art from the present disclosure that the projection 148 could extend downwardly toward the bottom of the groove 118 at an acute angle, if desired.

The projection 148 has a width that remains constant or decreases as the projection 148 extends away from the body 142 of the second back-up ring 140. Fillet surfaces 154, 155 are located at the acute angle between the projection 148 and the body 142 of the second back-up ring 140, and on the opposing side at the obtuse angle at the intersection of the projection 148 and the body 142, respectively.

The groove 138 on the first back-up ring 130 is complementarily shaped to the projection 148 on the second back-up ring 140 such that the first and second back-up rings 130, 140 can be interlocked together by connecting the projection 148 and the groove 138. The first back-up ring assembly 128 is adapted to be located in the groove 118 of the first mating surface 112 adjacent to the sealing element 120 with the first surface 134 of the first back-up ring 130 being adjacent to the upstanding leg 124 of the sealing element to reduce wear while preventing extrusion of the sealing element 120 into the gap 116 between the two mating surfaces 112, 114.

In the eighth preferred embodiment of the seal assembly 110, the projection 148 on the second back-up ring 140 can be connected to the groove 138 of the first back-up ring 130 with deformation of the first back-up ring body 132 based on the configuration of the projection 148 and the groove 138. It will be recognized by those skilled in the art from the present disclosure that the projection 148 can extend toward the base of the groove 118, as opposed to outwardly toward the gap 116. It will be similarly recognized that the projection 148 could be located on the first back-up ring 130 and the groove 138 could be located on the second back-up ring 140, if desired.

Preferably, a second back-up ring assembly 158 is also adapted to be located in the groove 118 on an opposite side of the seal 120 from the first back-up ring assembly 128.

The first and second back-up rings 130, 140 are preferably made of the same materials as discussed above in connection with the first preferred embodiment of the invention. However, it will be recognized by those skilled in the art from the present disclosure that a stiffer material could be used for the first back-up ring 130 since it does not have to be substantially deflected in order to be assembled with the second back-up ring 140.

In use, the first and second back-up ring assemblies 128, 158 remain locked together and any relative movement between the first and second mating operational surfaces 112, 114 which causes the leg 124 of the sealing element to press against one of the back-up ring assemblies 128, 158 acts to force the first and second back-up rings 130, 140 more closely together based on the angle of the projection 148. The fillet surfaces 154, 155 located at the acute angle between the projection 148 and the body 142 and at the obtuse angle on the opposite side of the projection 148 help to reduce the stress concentration at the projection 148 to increase the life of the seal assembly 110.

The use of two back-up rings 130, 140 with the interlocking connection also provides for ease of installation and assembly, since the relatively softer first back-up ring 130 is supported and held in position in the groove 118 by the interlocking connection with the second back-up ring 140. This allows the back-up ring assembly 128 to function as a solid back-up ring.

It will be recognized by those skilled in the art from the present disclosure that the first and second interlocked backup rings 130, 140 can be used in connection with various other seal configurations to prevent extrusion of the sealing element in to the gap between the two operational surfaces 112, 114.

Figure 10:
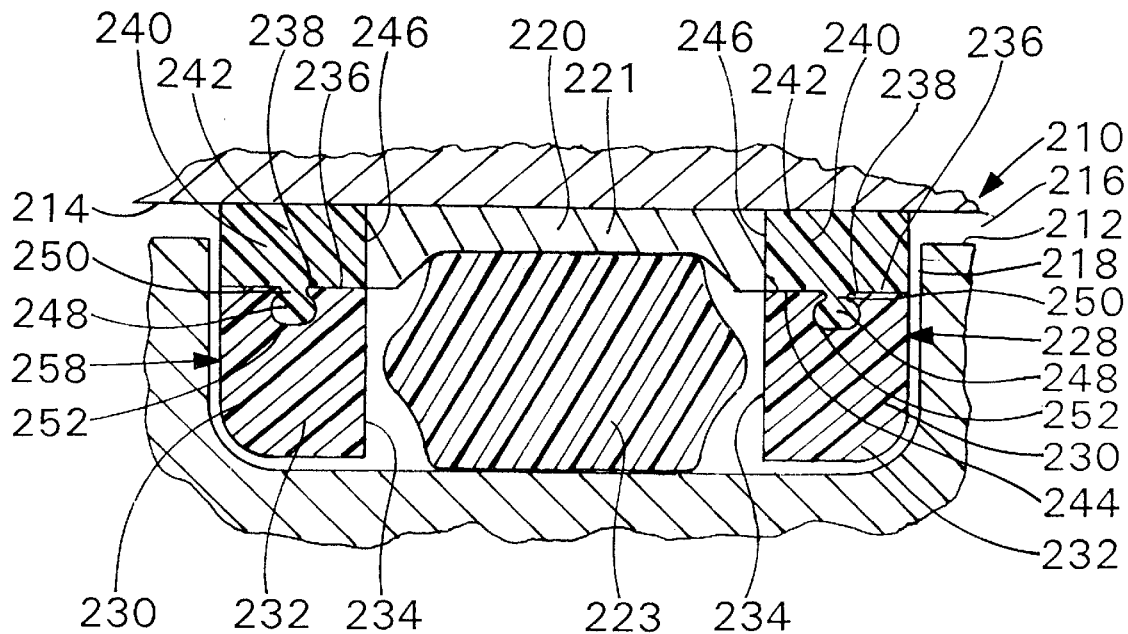
FIG. 10 is a cross-sectional view similar to FIG. 2 showing a seal assembly in accordance with a ninth preferred embodiment of the invention.

Referring now to FIG. 10, a seal assembly 210 in accordance with a ninth preferred embodiment of the invention is shown. The seal assembly 210 is a cap seal having an elastomer energized seal 220 with anti-extrusion ring assemblies 228, 258 located on each side of the seal. The anti-extrusion ring assemblies 228, 258 are similar to those described in accordance with the first preferred embodiment of the invention 10, and similar elements have been identified with the same element numbers having the prefix "2". For example, the first back-up ring assembly 228 of the seal assembly 210 in accordance with the ninth preferred embodiment of the invention is similar to the back-up ring assembly 28 in the seal assembly 10 of the first preferred embodiment of the invention. A detailed description of the seal assembly 210 in accordance with the ninth preferred embodiment of the invention follows.

As shown in FIG. 10, the seal assembly 210 in accordance with the ninth preferred embodiment of the invention is also used for sealing two mating operational surfaces 212, 214 spaced apart by a gap 216. One of the surfaces preferably includes an annular seal assembly receiving groove 218. A sealing element 220 is adapted to be located in the groove 218, which is preferably in the first mating surface 212. Preferably, the sealing element 220 includes a cap seal 221 and an energizer/expander element 223. The cap seal 221 has a sealing surface adapted for providing sealing contact with the second mating surface 214. The expander element 223 is designed to contact the bottom of the cap seal 221 to bias the cap seal 221 into sealing engagement with the second mating surface 214. The particular configuration of the cap seal 221 and expander element 223 may have other forms which are generally known to those skilled in the art.

The cap seal 221 is preferably made of relatively hard, non-resilient seal materials commonly used in elastomer energized seals, as compared to the energizer/expander element 223. For example, the cap seal 221 may be made of PTFE or any other suitable plastic such as polyether etherketone, poly(amide imide), polyether sulfone or other high-modulus plastic materials. The energizer/expander element 223 is preferably made from a relatively soft, resilient material such as natural or synthetic rubber materials or any other suitable elastomer which has the required elastic properties.

A first back-up assembly 228 is provided and includes a first back-up ring 230 having a body 232 with first and second sides 234, 236. The first back-up ring 230 is made from a relatively soft material. A groove 238 is located in the body 232 along the second side 236.

A second back-up ring 240 having a body 242 with first and second sides 244, 246 is also provided. The second back-up ring 240 is made from a relatively hard material and includes an interlocking projection 248 which is generally T-shaped. The interlocking projection 248 includes a narrow leg portion 250 which extends outwardly from the first side 244 of the body 242 of the second back-up ring 240, and a rounded anchor portion 252 connected to the leg portion 250. The anchor portion 252 has a width which is greater than the width of the leg portion 250 and includes rounded sides.

The groove 238 on the first back-up ring 230 is complementarily shaped to the projection 248 on the second back-up ring 240 and includes a rounded mating surface such that the first and second back-up rings 230, 240 can be interlocked together by connecting the interlocking projection 248 and the groove 238. The first back-up ring assembly 228 is adapted to be located in the groove 218 in the first mating surface 212 adjacent to the sealing element 221 to prevent extrusion of the cap seal 221 into the gap 216 between the two mating surfaces 212, 214. The rounded mating surface of the groove 238 in the first back-up ring 230 reduces stress concentrations in the first back-up ring 230 under load while providing an interlocking connection to prevent separation of the first and second back-up rings 230, 240.

Preferably, a second back-up ring assembly 258 is provided and is adapted to be located in the groove 218 in the first mating surface 212 on an opposite side of the sealing element 221 from the first back-up ring assembly 228.

The relatively soft first back-up ring 230 in the first and second back-up ring assemblies 228, 258 prevents abrasion wear to the soft elastomer element 223 and preferably extends along the entire radial length of the elastomer element 223. The second back-up ring 240 which is made of a relatively harder material prevents extrusion of the cap seal 221 into the gap 216 between the first and second mating surfaces 212, 214.

Preferably, the first and second back-up rings 230, 240 are provided in strip form and are joined into a ring using scarf cuts which are circumferentially displaced from each other, similar to the scarf cuts described above in conjunction with the first and second preferred embodiments of the invention. This arrangement allows the back-up ring assemblies 228, 258 to be machined or molded in strip form relatively inexpensively and to be sized and firmly joined together using the interlocking connection between the first and second back-up rings 230, 240. This eliminates the possibility of bond failure between the first and second back-up rings which could occur in back-up ring assemblies without the mechanical interlocking connection. However, the back-up rings of the present invention 230, 240 could each be molded or machined individually and then be pressed or slid together to form the back-up ring assemblies 228, 258, if desired. This is possible only if the first back-up ring 230 is softer.

Figure 11:
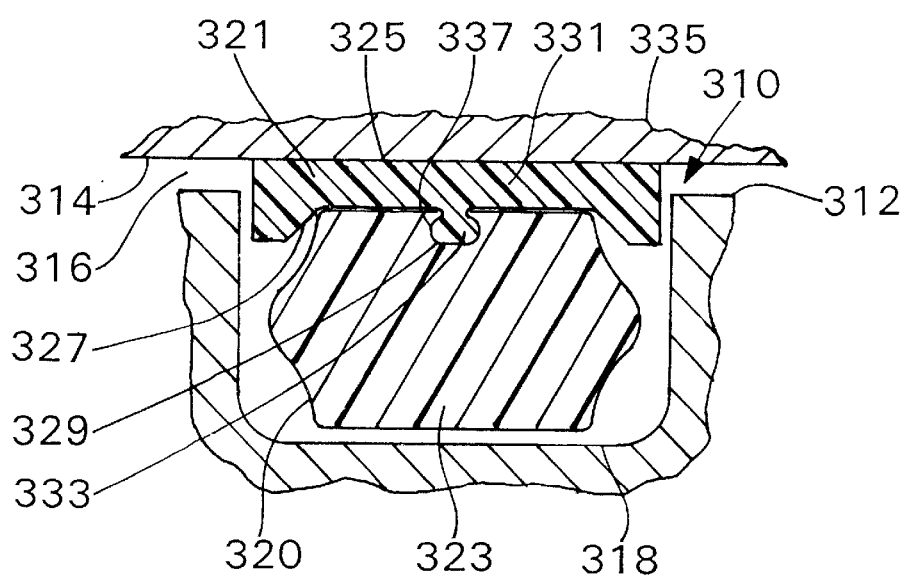
FIG. 11 is a cross-sectional view similar to FIG. 10 showing a seal assembly in accordance with a tenth preferred embodiment of the invention.

Referring now to FIG. 11, a tenth embodiment of a seal assembly 310 located between two operational surfaces 312, 314 is shown. The tenth embodiment of the seal assembly 310 includes a sealing element 320 located in a groove 318 in the first operational surface 312. The sealing element 320 includes a cap seal 321 with an energizer/expander element 323.

The cap seal 321 includes a sealing surface 325 which contacts the second operational surface 314, and an opposing second surface 327. An interlocking projection 329 which depends from second surface 327, and includes a leg portion 331 and a rounded anchor portion 333 connected to the leg portion 331. The rounded anchor portion 333 has a width which is greater than the width of the leg portion 331.

The energizer/expander element 323 includes a first surface 335 which faces the cap seal 321. A groove 337 is located in the first surface 335 of the energizer/expander element 323 which is complementary to the interlocking projection 329 on the cap seal 321, and includes a rounded mating surface and an opening which is narrower than the anchor portion 333.

The interlocking projection 329 on the cap seal 321 is aligned with and pressed or slid into the groove 337 on the energizer/expander element 323 to mechanically interlock the cap seal 321 to the energizer/expander element 323. This provides for ease of assembly, with the rigid cap seal 321 supporting the softer expander element 323 in a similar fashion to the interlocked back-up rings discussed above. The seal assembly 310 is used without backup rings, depending upon the particular application. However, it will be recognized by those skilled in the art from the present disclosure that this type of interlocking connection can be used for various other types of cap seal arrangements to mechanically interlock the cap seal 321 and the energizer/expander element 323. It will be similarly recognized that the groove 337 could be positioned on the cap seal 321 and the interlocking projection 329 on the expander/energizer element 323, if desired.

It will be appreciated by those skilled in the art that changes could be made to the embodiments described above without departing from the broad inventive concepts thereof. It is understood, therefore, that this invention is not limited to the particular embodiments disclosed, but it is intended to cover modifications within the spirit and scope of the present invention as defined by the appended claims.

What is claimed is:

1. A seal assembly adapted for use in sealing two mating operational surfaces spaced apart by a gap, one of said surfaces including an annular seal assembly receiving groove, the seal assembly comprising:

a sealing element adapted to be located in the groove;

a first back-up ring assembly including, a first back-up ring made from a relatively soft material having a body with first and second sides, one of a groove and an interlocking projection being located on the body along the second side, a second back-up ring having a body with first and second sides and being made from a relatively hard material, the second back-up ring including the other of the groove and the interlocking projection located along the first side, the interlocking projection includes a narrow leg portion which extends outwardly from the body of the one of the first and second back-up rings which includes the interlocking projection and a rounded anchor portion connected to the leg portion, the anchor portion having a width which is greater than a width of the leg portion and having rounded sides, the groove being complementarily shaped to the interlocking projection with an opening which is narrower than the anchor portion and having a rounded mating surface such that the first and second back-up rings can be interlocked together by connecting the interlocking projection and the groove; and the first back-up ring assembly being adapted to be located in the seal assembly receiving groove adjacent to the sealing element to prevent extrusion of the sealing element into the gap between the two mating surfaces with the rounded mating surface of the groove reducing stress concentrations in the first and second back-up rings under load.

2. A seal assembly adapted for use in sealing two mating operational surfaces spaced apart by a gap, one of said surfaces including an annular seal assembly receiving groove, the seal assembly comprising:

a sealing element adapted to be located in the groove;

a first back-up ring assembly including, a first back-up ring made from a relatively soft material having a body with first and second sides, one of a groove and an interlocking projection being located on the body along the second side, a second back-up ring having a body with first and second sides and being made from a relatively hard material, the second back-up ring including the other of the groove and the interlocking projection located along the first side, the interlocking projection including a narrow leg portion which extends outwardly from the body of the one of the first and second back-up rings which includes the interlocking projection and a rounded anchor portion connected to the leg portion, the anchor portion having a width which is greater than a width of the leg portion and having rounded sides, the groove being complementarily shaped to the interlocking projection with an opening which is narrower than the anchor portion and having a rounded mating surface such that the first and second back-up rings can be interlocked together by connecting the interlocking projection and the groove; and the first back-up ring assembly being adapted to be located in the seal assembly receiving groove adjacent to the sealing element to prevent extrusion of the sealing element into the gap between the two mating surfaces with the rounded mating surface of the groove reducing stress concentrations in the first and second back-up rings under load, wherein the first and second back-up rings each include a scarf cut, the scarf cuts being circumferentially offset relative to each other in the first back-up ring assembly.

3. The seal assembly of claim 2 further comprising a second back-up ring assembly adapted to be located in the seal assembly receiving groove between the two mating operational surfaces on an opposite side of the sealing element from the first back-up ring assembly.

4. The seal assembly of claim 3 wherein the sealing element is a T-shaped ring seal having a base portion and a protruding leg portion, and the first and second back-up ring assemblies are nested on the base against opposite sides of the protruding leg portion.

5. The seal assembly of claim 3 wherein the second back-up ring assembly is generally the same as the first back-up ring assembly.

6. The seal assembly of claim 2 wherein the first back-up ring is positioned adjacent to the sealing element to reduce abrasion wear on the sealing element.

7. The seal assembly of claim 2 wherein the first back-up is made of a polymeric material such that the body of the first back-up ring elastically deforms to allow interlocking engagement of the groove with the projection.

8. The seal assembly of claim 2 wherein the first and second back-up rings comprise polymeric materials.

9. The seal assembly of claim 2 wherein the first back-up ring comprises PTFE.

10. The seal assembly of claim 2 wherein the second back-up ring comprises polyether etherketone.

11. A seal assembly adapted for use in sealing two mating operational surfaces spaced apart by a gap, one of said surfaces including an annular seal assembly receiving groove, the seal assembly comprising:

a sealing element adapted to be located in the groove;

a first back-up ring assembly including, a first back-up ring having a body with first and second sides and being made from a relatively soft material, one of a groove and an interlocking projection being located on the body along the second side, a second back-up ring having a body with first and second sides and being made from a relatively hard material, the second back-up ring including the other of the groove and the interlocking projection, the interlocking projection includes a narrow leg portion which extends outwardly from the body of the one of the first and second back-up rings which includes the interlocking projection, and a rounded anchor portion connected to the leg portion, the rounded anchor portion having a width which is greater than a width of the leg portion and having rounded sides, the groove being complementarily shaped to the projection on the second back-up ring with an opening having a narrower width than the rounded anchor portion and having a rounded mating surface such that the first and second back-up rings can be interlocked together by connecting the interlocking projection and the groove;

the first back-up ring assembly being adapted to be located in the seal assembly receiving groove adjacent to the sealing element to prevent extrusion of the sealing element into the gap between the two mating operational surfaces with the rounded mating surface of the groove reducing stress concentrations in the first and second back-up rings under load; and wherein the first and second back-up rings each include a scarf cut, the scarf cut being circumferentially offset relative to each other in the first backup ring assembly.

12. The seal assembly of claim 11 further comprising a second back-up ring assembly adapted to be located in the groove on an opposite side of the sealing element from the first back-up ring assembly.

\* \* \* \* \*

UNITED STATES PATENT AND TRADEMARK OFFICE
CERTIFICATE OF CORRECTION

PATENT NO. : 5,879,010
DATED : March 9, 1999
INVENTOR(S) : Vinay K. Nilkanth, et al.

It is certified that error appears in the above-indentified patent and that said Letters Patent is hereby corrected as shown below:

Title page, item [73] Assignee: "Green Tweed of Delaware, Inc." should read "Greene, Tweed of Delaware, Inc.".

Signed and Sealed this

Thirteenth Day of July, 1999

Attest:

Q. TODD DICKINSON

*Attesting Officer*     *Acting Commissioner of Patents and Trademarks*